(12) United States Patent
Manokhin

(10) Patent No.: US 11,877,105 B1
(45) Date of Patent: Jan. 16, 2024

(54) PHASE DISPARITY CORRECTION FOR IMAGE SENSORS

(71) Applicant: Apple Inc., Cupertino, CA (US)

(72) Inventor: Gennady A. Manokhin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 17/199,330

(22) Filed: Mar. 11, 2021

Related U.S. Application Data

(60) Provisional application No. 63/026,517, filed on May 18, 2020.

(51) Int. Cl.
| | |
|---|---|
| *H04N 9/64* | (2023.01) |
| *G06T 3/40* | (2006.01) |
| *G06T 5/00* | (2006.01) |
| *G06T 7/50* | (2017.01) |

(52) U.S. Cl.
CPC ............ *H04N 9/64* (2013.01); *G06T 3/4007* (2013.01); *G06T 3/4015* (2013.01); *G06T 5/002* (2013.01); *G06T 7/50* (2017.01)

(58) Field of Classification Search
None
See application file for complete search history.

(56) References Cited

U.S. PATENT DOCUMENTS

| | | | |
|---|---|---|---|
| 6,014,239 | A | 1/2000 | Veligdan |
| 7,507,203 | B2 | 3/2009 | Sebastian et al. |
| 8,824,706 | B2 | 9/2014 | Stephanou et al. |
| 9,741,344 | B2 | 8/2017 | Bakish |
| 10,824,275 | B2 | 9/2020 | Mutlu et al. |
| 11,029,442 | B2 | 6/2021 | Mutlu et al. |

(Continued)

FOREIGN PATENT DOCUMENTS

| | | |
|---|---|---|
| CN | 105092014 | 11/2015 |
| CN | 111045028 | 4/2020 |

OTHER PUBLICATIONS

Paschotta, "Optical Heterodyne Detection," *Encyclopedia of Laser Physics and Technology*, 1st edition, Oct. 2008, Wiley-VCH, ISBN 978-3-527-40828-3; pp. 1-8.

(Continued)

*Primary Examiner* — Xiaolan Xu
(74) *Attorney, Agent, or Firm* — Brownstein Hyatt Farber Schreck, LLP

(57) ABSTRACT

An imaging device includes an image sensor and an image processor. The image sensor includes an array of pixels. At least one pixel in the array of pixels includes an array of phase disparity subpixels. The array of pixels includes a set of filter elements arranged in a filter pattern, with different subsets of pixels receiving light through different types of filter elements in the set of filter elements. The image processor is configured to receive values measured by at least the phase disparity subpixels; estimate phase disparities between the received values; generate, using the estimated phase disparities, a set of corrected values for the phase disparity subpixels; and generate, using the set of corrected values for the phase disparity subpixels, a set of demosaiced values for each image plane in a set of image planes. Each image plane is associated with a different type of filter element in the set of filter elements.

20 Claims, 13 Drawing Sheets

(56) References Cited

U.S. PATENT DOCUMENTS

| | | |
|---|---|---|
| 11,473,898 B2 | 10/2022 | Mutlu et al. |
| 2010/0277571 A1* | 11/2010 | Xu .......................... G06T 17/00 |
| | | 348/47 |
| 2012/0306823 A1 | 12/2012 | Pance |
| 2017/0150254 A1 | 5/2017 | Bakish et al. |
| 2018/0233129 A1 | 8/2018 | Bakish et al. |
| 2019/0090068 A1 | 3/2019 | Fishman et al. |
| 2019/0110040 A1* | 4/2019 | Doyen ................. H04N 13/268 |
| 2019/0253608 A1* | 8/2019 | Lee .......................... G06T 7/50 |
| 2021/0010797 A1 | 1/2021 | Cihan et al. |
| 2022/0155052 A1 | 5/2022 | Mutlu et al. |
| 2023/0070733 A1 | 3/2023 | Whitney et al. |
| 2023/0083807 A1 | 3/2023 | Tal et al. |

OTHER PUBLICATIONS

Rogers et al., "A universal 3D imaging sensor on a silicon photonics platform," *Nature*, Feb. 11, 2021, vol. 590, 18 pages.

Sun et al., "Large-scale nanophotonic phased array," *Nature*, Jan. 10, 2013, vol. 293, Nature, pp. 195-199.

Kwan et al., "Demosaicing of Bayer and CFA 2.0 Patters for Low Lighting Images," *Electronics*, 2019, vol. 8, No. 1444, pp. 1-58.

Nie et al., "Deeply Learned Filter Response Functions for Hyperspectral Reconstruction," 2018 IEEE/CVF Conference on Computer Vision and Pattern Recognition, Salt Lake City, Utah, 2018, pp. 4767-4776.

Steinacher, "Balanced Photo-Detector (BPD) Physics Basel SP1'023)," User's Manual, Revision 1.3, Apr. 2017, 5 pages.

\* cited by examiner

PHASE DISPARITY CORRECTION FOR IMAGE SENSORS

FIELD

This application is a nonprovisional of and claims the benefit under 35 U.S.C. § 119(e) of U.S. Provisional Patent Application No. 63/026,517, filed May 18, 2020, the contents of which are incorporated herein by reference as if fully disclosed herein.

FIELD

The described embodiments generally relate to image sensors or the sensing of electromagnetic radiation (e.g., light). More particularly, the described embodiments relate to phase disparity correction for image sensors.

BACKGROUND

Devices such as smartphones, tablet computers, digital cameras, and robotic and vehicle navigation systems often include image sensors. One common type of image sensor is the complementary metal-oxide-semiconductor (CMOS) image sensor.

Some image sensors include asymmetric pixels (ASPs), which are sometimes referred to as phase detection autofocus (PDAF) pixels or phase disparity pixels. An asymmetric pixel includes an element, such as a shield or a lens, that restricts the directions or incident angles of electromagnetic radiation that may impinge on a photodetector of the pixel. Asymmetric pixels having different directional asymmetries can provide focus information to an image processor, enabling the image processor to quickly determine whether an image is in-focus or out-of-focus, and either process an image to improve (or blur) its focus, or provide feedback to an auto-focus mechanism that adjusts a relationship between the image sensor and one or more lenses that focus an image on the image sensor.

One type of image sensor that is gaining popularity is the quad Bayer color filter array image sensor. In a quad Bayer color filter array image sensor, a plurality of red, green, and blue pixels are arranged in accordance with a Bayer color filter pattern, but each red, green, and blue pixel includes a 2×2 array of phase disparity subpixels. The array of phase disparity subpixels associated with a particular pixel may be disposed under a microlens having a curvature, which curvature causes each subpixel to receive electromagnetic radiation from different directions or angles. This introduces phase disparities between the values measured by the different subpixels of a pixel. The phase disparities can be used by an image processor or software application to identify, correct, or blur out-of-focus areas of an image. In low light conditions, the values measured by a subset of phase disparity subpixels associated with a pixel may be combined to provide an image having a pixel resolution instead of a subpixel resolution.

SUMMARY

Embodiments of the systems, devices, methods, and apparatus described in the present disclosure are directed to phase disparity correction for image sensors and, in particular, phase disparity correction for quad Bayer color filter array image sensors. In a quad Bayer color filter array image sensor, phase disparities between the values measured by a subset of phase disparity subpixels associated with a pixel (e.g., a red, green, or blue pixel) may introduce image artifacts during a demosaicing process. To mitigate the introduction of such image artifacts, the systems, devices, methods, and apparatus described herein estimate and correct phase disparities between subpixels prior to demosaicing.

In a first aspect, the present disclosure describes an imaging device. The imaging device may include an image sensor and an image processor. The image sensor may include an array of pixels. At least one pixel in the array of pixels may include an array of phase disparity subpixels. The array of pixels may include a set of filter elements arranged in a filter pattern, with different subsets of pixels receiving light through different types of filter elements in the set of filter elements. The image processor may be configured to receive values measured by at least the phase disparity subpixels; estimate phase disparities between the received values; generate, using the estimated phase disparities, a set of corrected values for the phase disparity subpixels; and generate, using the set of corrected values for the phase disparity subpixels, a set of demosaiced values for each image plane in a set of image planes. Each image plane is associated with a different type of filter element in the set of filter elements.

In another aspect, the present disclosure describes a method of processing an image. The method may include acquiring values from phase disparity subpixels in a quad Bayer color filter array image sensor, in which each pixel of the image sensor comprises a 2×2 array of phase disparity subpixels. The method may also include estimating phase disparities between the measurement values acquired by the phase disparity subpixels; correcting the values using the estimated phase disparities; and generating a demosaiced set of image planes using the corrected values. Each image plane may be associated with a different color in a Bayer color filter.

In still another aspect of the disclosure, an imaging device having an image processing pipeline is described. The image processing pipeline may include a phase disparity estimator configured to receive a set of values acquired by at least a set of phase disparity subpixels in an image sensor and estimate phase disparities between the values, and a phase disparity corrector configured to correct the values using the estimated phase disparities. The image processing pipeline may further include a demosaicer configured to operate on the corrected values and generate a set of demosaiced values for each image plane in a set of image planes.

In addition to the aspects and embodiments described above, further aspects and embodiments will become apparent by reference to the drawings and by study of the following description.

BRIEF DESCRIPTION OF THE DRAWINGS

The disclosure will be readily understood by the following detailed description in conjunction with the accompanying drawings, wherein like reference numerals designate like structural elements, and in which.

Figure 1A:
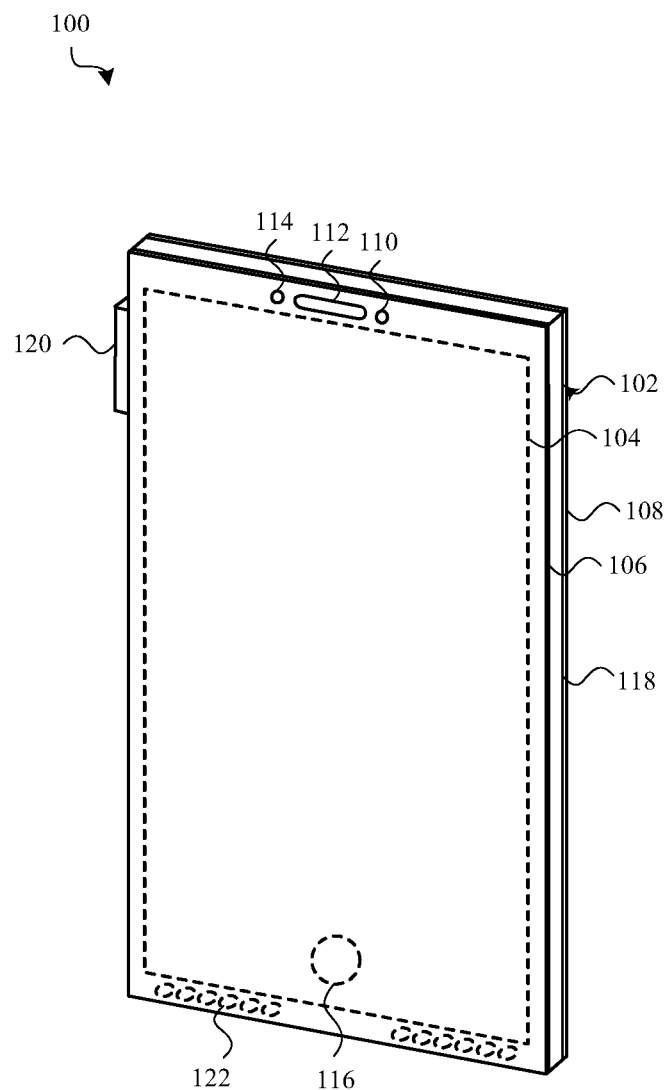
FIGS. 1A and 1B show an example of a device that may include an image sensor.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments and appended claims.

Demosaicing (also referred to as deBayering) is an image processing technique used to reconstruct a set of full color images, or image planes, from the incomplete color samples produced by an image sensor disposed under a color filter array (CFA). In a quad Bayer color filter array image sensor, phase disparities between the values measured by a subset of phase disparity subpixels associated with a pixel (e.g., a red, green, or blue pixel) may introduce image artifacts during the demosaicing process. To mitigate the introduction of such image artifacts, the systems, devices, methods, and apparatus described herein estimate and correct phase disparities between subpixels, prior to demosaicing.

Although various embodiments are described, those skilled in the art will readily appreciate that the detailed description given herein is for explanatory purposes only and should not be construed as limiting.

Directional terminology, such as "top", "bottom", "upper", "lower", "front", "back", "over", "under", "above", "below", "left", "right", etc. is used with reference to the orientation of some of the components in some of the figures described below. Because components in various embodiments can be positioned in a number of different orientations, directional terminology is used for purposes of illustration only and is in no way limiting. The directional terminology is intended to be construed broadly, and therefore should not be interpreted to preclude components being oriented in different ways. Also, as used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

Figure 1B:
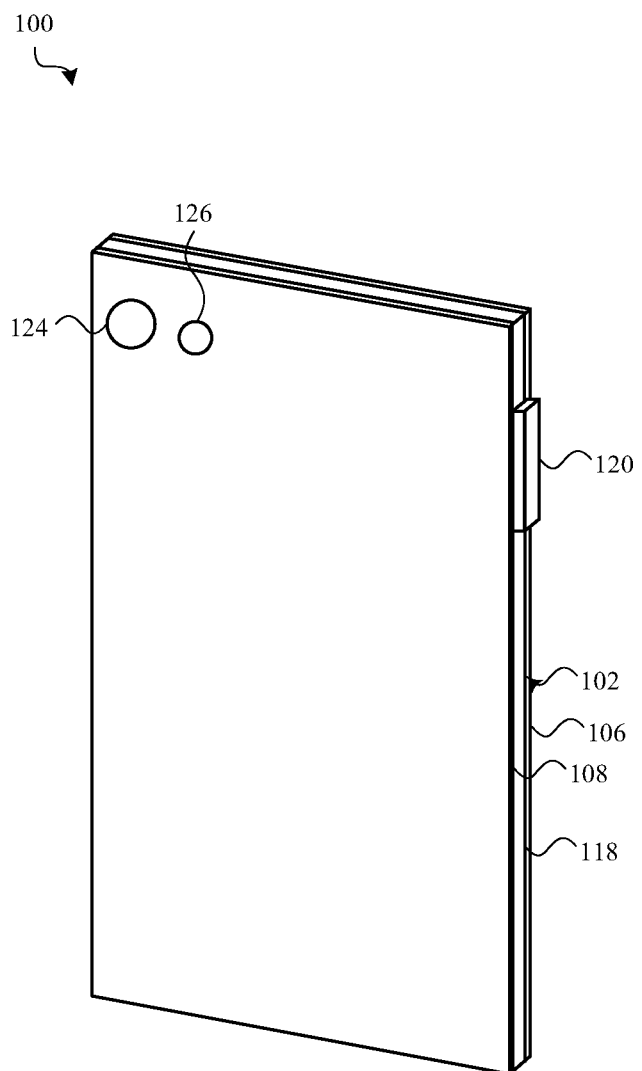

FIGS. 1A and 1B show an example of a device 100 that may include an image sensor. The device's dimensions and form factor, including the ratio of the length of its long sides to the length of its short sides, suggest that the device 100 is a mobile phone (e.g., a smartphone). However, the device's dimensions and form factor are arbitrarily chosen, and the device 100 could alternatively be any portable electronic device including, for example a mobile phone, tablet computer, portable computer, portable music player, wearable device (e.g., an electronic watch, health monitoring device, or fitness tracking device), augmented reality (AR) device, virtual reality (VR) device, mixed reality (MR) device, gaming device, portable terminal, digital single-lens reflex (DSLR) camera, video camera, vehicle navigation system, robot navigation system, or other portable or mobile device. The device 100 could also be a device that is semi-permanently located (or installed) at a single location. FIG. 1A shows a front isometric view of the device 100, and FIG. 1B shows a rear isometric view of the device 100. The device 100 may include a housing 102 that at least partially surrounds a display 104. The housing 102 may include or support a front cover 106 or a rear cover 108. The front cover 106 may be positioned over the display 104, and may provide a window through which the display 104 may be viewed. In some embodiments, the display 104 may be attached to (or abut) the housing 102 and/or the front cover 106. In alternative embodiments of the device 100, the display 104 may not be included and/or the housing 102 may have an alternative configuration.

The display 104 may include one or more light-emitting elements, and in some cases may be a light-emitting diode (LED) display, an organic LED (OLED) display, a liquid crystal display (LCD), an electroluminescent (EL) display, or another type of display. In some embodiments, the display 104 may include, or be associated with, one or more touch and/or force sensors that are configured to detect a touch and/or a force applied to a surface of the front cover 106.

The various components of the housing 102 may be formed from the same or different materials. For example, a sidewall 118 of the housing 102 may be formed using one or more metals (e.g., stainless steel), polymers (e.g., plastics), ceramics, or composites (e.g., carbon fiber). In some cases, the sidewall 118 may be a multi-segment sidewall including a set of antennas. The antennas may form structural components of the sidewall 118. The antennas may be structurally coupled (to one another or to other components) and electrically isolated (from each other or from other components) by one or more non-conductive segments of the sidewall 118. The front cover 106 may be formed, for example, using one or more of glass, a crystal (e.g., sapphire), or a transparent polymer (e.g., plastic) that enables a user to view the display 104 through the front cover 106. In some cases, a portion of the front cover 106 (e.g., a perimeter portion of the front cover 106) may be coated with an opaque ink to obscure components included within the housing 102. The rear cover 108 may be formed using the same material(s) that are used to form the sidewall 118 or the front cover 106. In some cases, the rear cover 108 may be part of a monolithic element that also forms the sidewall 118 (or in cases where the sidewall 118 is a multi-segment sidewall, those portions of the sidewall 118 that are conductive or non-conductive). In still other embodiments, all of the exterior components of the housing 102 may be formed from a transparent material, and components within the device 100 may or may not be obscured by an opaque ink or opaque structure within the housing 102.

The front cover 106 may be mounted to the sidewall 118 to cover an opening defined by the sidewall 118 (i.e., an opening into an interior volume in which various electronic components of the device 100, including the display 104, may be positioned). The front cover 106 may be mounted to the sidewall 118 using fasteners, adhesives, seals, gaskets, or other components.

A display stack or device stack (hereafter referred to as a "stack") including the display 104 may be attached (or abutted) to an interior surface of the front cover 106 and extend into the interior volume of the device 100. In some cases, the stack may include a touch sensor (e.g., a grid of capacitive, resistive, strain-based, ultrasonic, or other type of touch sensing elements), or other layers of optical, mechanical, electrical, or other types of components. In some cases, the touch sensor (or part of a touch sensor system) may be configured to detect a touch applied to an outer surface of the front cover 106 (e.g., to a display surface of the device 100).

In some cases, a force sensor (or part of a force sensor system) may be positioned within the interior volume above, below, and/or to the side of the display 104 (and in some cases within the device stack). The force sensor (or force sensor system) may be triggered in response to the touch sensor detecting one or more touches on the front cover 106 (or a location or locations of one or more touches on the front cover 106), and may determine an amount of force associated with each touch, or an amount of force associated with a collection of touches as a whole. In some embodiments, the force sensor (or force sensor system) may be used to determine a location of a touch, or a location of a touch in combination with an amount of force of the touch. In these latter embodiments, the device 100 may not include a separate touch sensor.

As shown primarily in FIG. 1A, the device 100 may include various other components. For example, the front of the device 100 may include one or more front-facing cameras 110 (including one or more image sensors), speakers 112, microphones, or other components 114 (e.g., audio, imaging, and/or sensing components) that are configured to transmit or receive signals to/from the device 100. In some cases, a front-facing camera 110, alone or in combination with other sensors, may be configured to operate as a bio-authentication or facial recognition sensor. In some cases, the front-facing camera 110 or other sensors may be moved under the display 104, and may sense through the display 104. The device 100 may also include various input devices, including a mechanical or virtual button 116, which may be accessible from the front surface (or display surface) of the device 100.

The device 100 may also include buttons or other input devices positioned along the sidewall 118 and/or on a rear surface of the device 100. For example, a volume button or multipurpose button 120 may be positioned along the sidewall 118, and in some cases may extend through an aperture in the sidewall 118. The sidewall 118 may include one or more ports 122 that allow air, but not liquids, to flow into and out of the device 100. In some embodiments, one or more sensors may be positioned in or near the port(s) 122. For example, an ambient pressure sensor, ambient temperature sensor, internal/external differential pressure sensor, gas sensor, particulate matter concentration sensor, or air quality sensor may be positioned in or near a port 122.

In some embodiments, the rear surface of the device 100 may include a rear-facing camera 124 that includes one or more image sensors (see FIG. 1B). A flash or light source 126 may also be positioned on the rear of the device 100 (e.g., near the rear-facing camera). In some cases, the rear surface of the device 100 may include multiple rear-facing cameras.

Figure 2A:
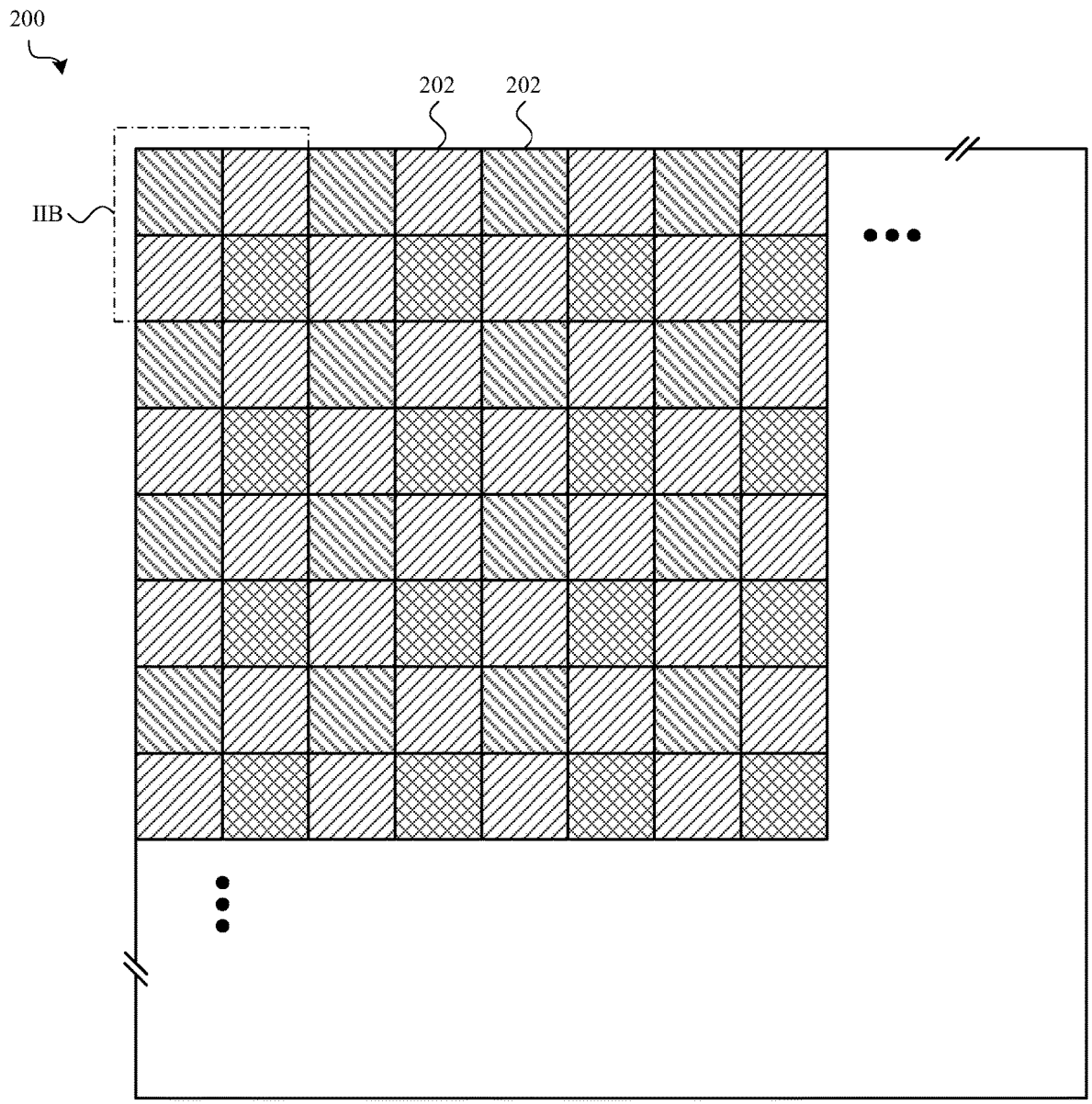
FIG. 2A shows a plan view of an example image sensor.
Figure 2A:
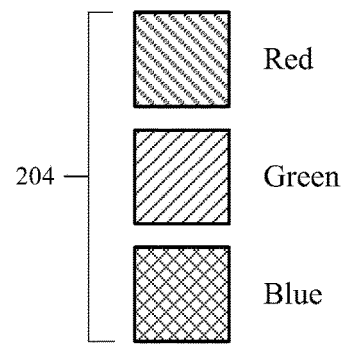

FIG. 2A shows a plan view of an example image sensor 200. In some embodiments, the image sensor 200 may be used in one of the cameras described with reference to FIGS. 1A and 1B. The image sensor 200 may include an array of pixels 202. The array of pixels 202 may include a set of filter elements 204 arranged in a filter pattern. Different subsets of pixels in the array of pixels 202 may receive light through different types of filter elements in the set of filter elements 204. In some embodiments, the different types of filter elements may include red filter elements, green filter elements, and blue filter elements, which filter elements may be arranged in a Bayer color filter pattern. In some embodiments, the different types of filter elements may include other types of colored filter elements, or types of filter elements that vary by other than color. Alternatively, the array of pixels 202 may receive unfiltered light, or the array of pixels 202 may receive light that is filtered in the same or similar ways (e.g., in the case of a monochrome image sensor).

Figure 2B:
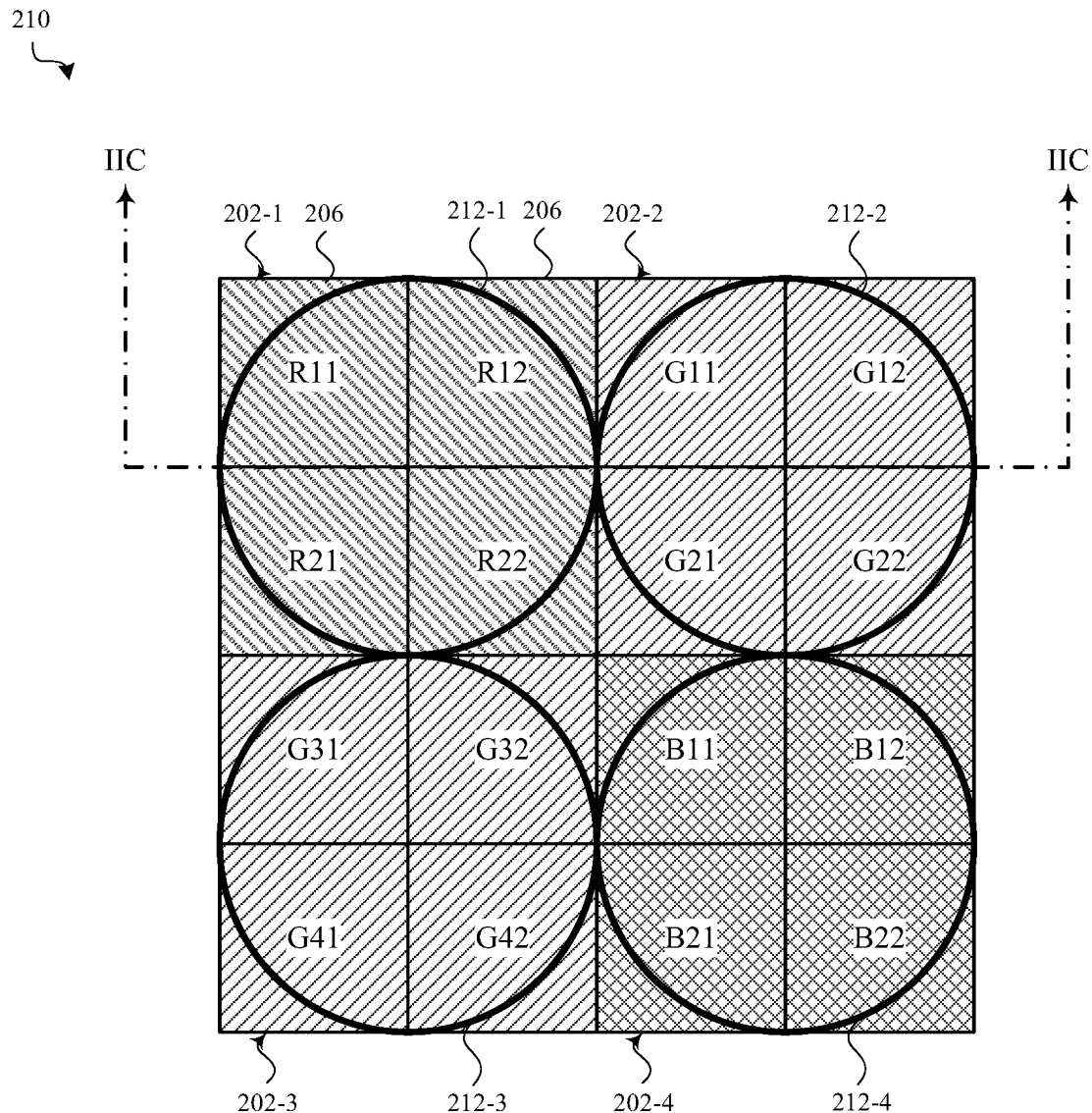
FIG. 2B shows an enlarged portion of an image sensor, which in some cases may be a portion of the image sensor described with reference to FIG. 2A.
Figure 2B:
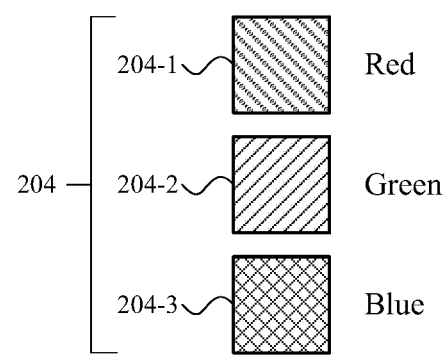

FIG. 2B shows an enlarged portion 210 of an image sensor, which in some cases may be a portion of the image sensor 200 described with reference to FIG. 2A (e.g., the portion IIB of FIG. 2A). The portion 210 of the image sensor includes a 2×2 array of pixels 202.

In some embodiments, and as shown, each pixel 202-1, 202-2, 202-3, 202-4 may include an array of subpixels 206. In some embodiments, each array of subpixels 206 may include one or more phase disparity subpixels and, in some cases, each of the subpixels in an array of subpixels 206 may be a phase disparity subpixel (e.g., the array of subpixels 206 that defines a pixel 202 may be an array of phase disparity subpixels). As shown, each array of subpixels 206 may include a 2×2 array of subpixels (e.g., a 2×2 array of phase disparity subpixels). In alternative embodiments, an array of subpixels 206 may alternatively include a 2×1 array of subpixels, a 4×4 array of subpixels, or any other array of subpixels.

By way of example, a red pixel 202-1 is shown to include subpixels 206 labeled R11, R12, R21, and R22. Similarly, a first green pixel 202-2 is shown to include subpixels 206 labeled G11, G12, G21, and G22; a second green pixel 202-3 is shown to include subpixels 206 labeled G31, G32, G41, and G42; and a blue pixel 202-4 is shown to include subpixels 206 labeled B11, B12, B21, and B22.

In alternative embodiments, some pixels 202 may include an array of subpixels 206, and other pixels 202 may not include an array of subpixels 206. For example, one or both of the pixels 202-2, 202-3 that receive light through a green filer element may include an array of subpixels 206, but the pixels 202-1, 202-4 that receive light through a red filter element or a blue filter element may not include arrays of subpixels 206.

The array of pixels 202 may include a set of filter elements 204 arranged in a filter pattern (e.g., a Bayer color filter pattern including red filter elements 204-1, green filter elements 204-2, and blue filter elements 204-3). The array of pixels 202 may also include an on-chip lens (OCL) array (e.g., a microlens array), with different OCLs 212-1, 212-2, 212-3, 212-4 being associated with different pixels 202. For example, the red 202-1 may include a first OCL 212-1; the first green pixel 202-2 may include a second OCL 212-2, the second green pixel 202-3 may include a third OCL 212-3, and the blue pixel 202-4 may include a fourth OCL 212-4. Each OCL 212 may have a curvature (or alternatively, a material gradient) that causes the subpixels 206 of a pixel 202 to generate similar values when a portion of an image captured by the pixel 202 is in-focus, but generate measurably different values when the portion of the image captured by the pixel 202 is out-of-focus. The measurably different values indicate that a phase disparity (e.g., an out-of-focus condition) exists. A phase disparity may exist between horizontal or vertical subsets of the pixel's subpixels 206, or between horizontal and vertical subsets of the pixel's subpixels 206. The phase disparity(ies) may be used to physically adjust the focus of the image sensor (e.g., by changing the distance between the image sensor and one or more lenses), or the phase disparity may be removed or accentuated by an image signal processor (ISP) or software application.

Each subpixel 206 may include a respective photodetector (e.g., a photodiode). Each subpixel 206 may be associated with its own readout circuitry; or, in some cases, readout circuitry may be shared by the subpixels 206 of a pixel 202, or by subpixels 206 of different pixels 202.

The filter elements 204 may take solid, gel, or liquid forms, for example. The filter elements 204 may also be organic or inorganic. In some embodiments, the filter elements 204 may be discrete elements, or components of a substrate or film, disposed between the OCL array and a substrate on which (or in which) photodetectors are formed. In other embodiments, the filter elements 204 may take the form of films, inks, or other elements formed directly on the substrate on/in which photodetectors are formed. In other embodiments, the filter elements may be integrated with, or applied to, or formed on the OCL array.

Figure 2C:
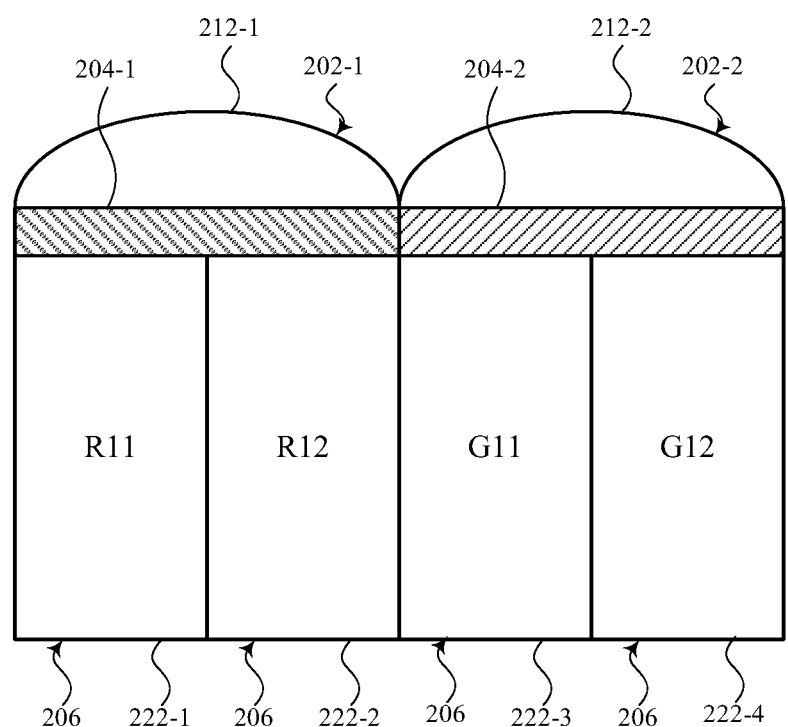
FIG. 2C shows an example cross-section of the portion of an image sensor described with reference to FIG. 2B.
Figure 2C:
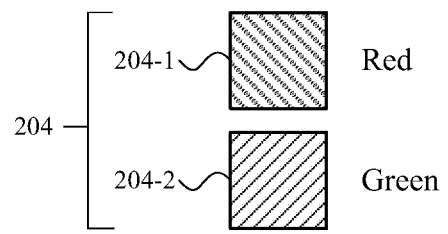

FIG. 2C shows an example cross-section 220 of the portion 210 of an image sensor described with reference to FIG. 2B. By way of example, the cross-section 220 is taken along the line IIC-IIC in FIG. 2B. The cross-section shows two subpixels (R11, R12) of the red pixel 202-1, and two subpixels (G11, G12) of the first green pixel 202-2.

Each of the subpixels (R11, R12, G11, G12) may include a separate photodetector 222 (e.g., a photodetector 222-1, 222-2, 222-3, or 222-4). Adjacent photodetectors 222 may be separated by shallow trench isolation (STI) or deep trench isolation (DTI).

The subpixels R11, R12 of the red pixel 202-1 receive light through a shared first OCL 212-1 and a shared red filter element 204-1. More particularly, the photodetectors 222-1, 222-2 of the red pixel 202-1 receive light through the shared first OCL 212-1 and the shared red filter element 204-1. Similarly, the subpixels G11, G12 of the first green pixel 202-2 receive light through a shared second OCL 212-2 and a shared green filter element 204-2.

Photons of light that impinge on different portions of a curved OCL (e.g., the first OCL 212-1), or photons of light that impinge on the curved OCL at different angles, may be received at a particular photodetector disposed under the OCL. When a portion of an image captured by an image sensor including the subpixels is in focus, all of the photodetectors that receive light through the OCL may generate similar values. However, when the portion of the image is out-of-focus, different ones of the photodetectors may generate measurably different values, which measurably different values are indicative of a phase disparity (e.g., an out-of-focus condition).

In some alternative embodiments, the OCLs 212-1, 212-2 need not be curved but may have material gradients (e.g., the OCLs may be Graded-Index (GRIN) lenses); or the OCLs 212-1, 212-2 may be other types of lenses (e.g., Fresnel lenses). In some embodiments, the OCLs 212-1, 212-2 need not be provided and the subpixels 206 may be partially-shielded subpixels (e.g., subpixels that have metal shields covering different sides or regions of their light-receiving surfaces).

Figure 3:
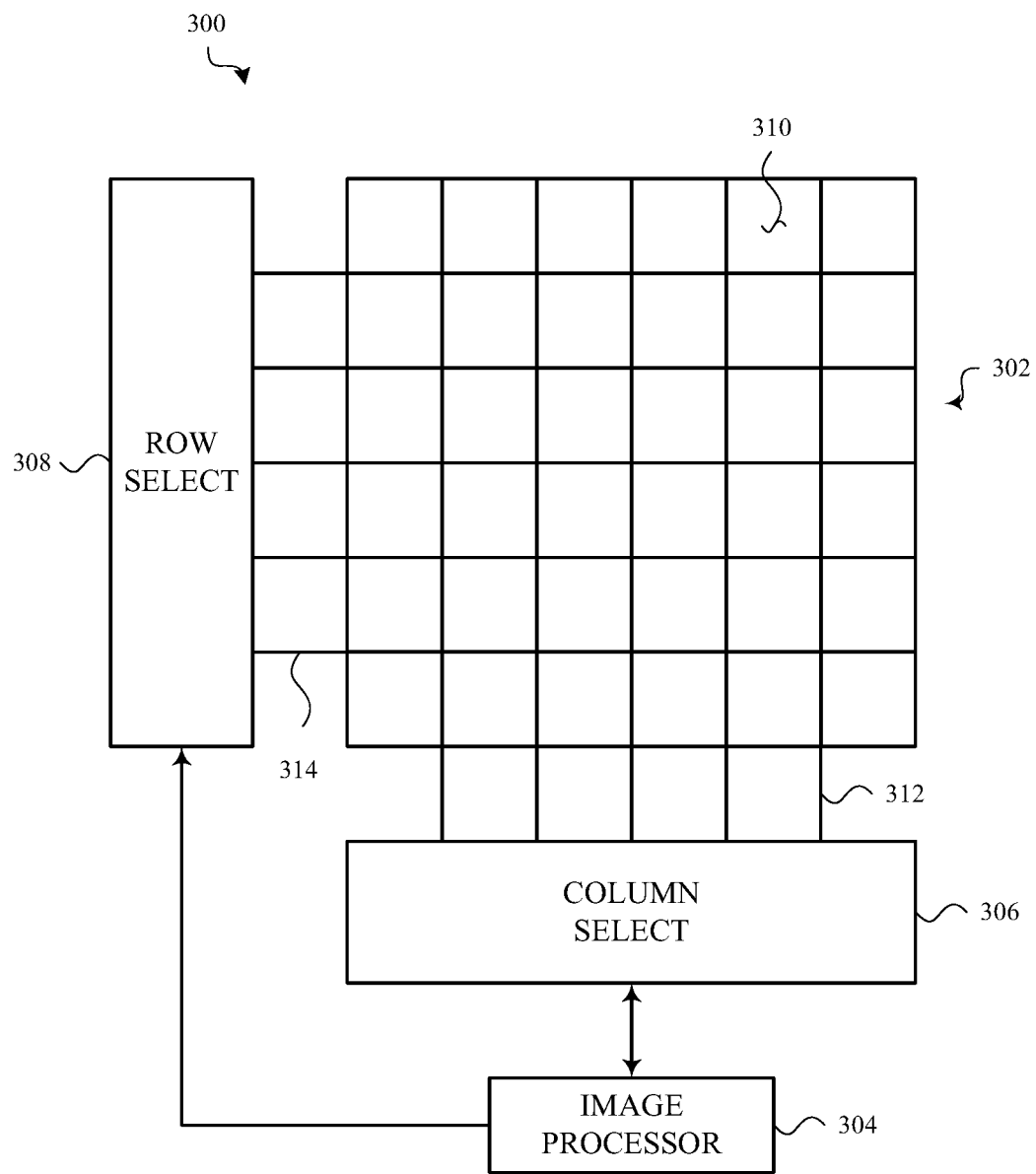
FIG. 3 shows an example block diagram of an example imaging device, which in some cases may be part of one of the cameras described with reference to FIGS. 1A and 1B.

FIG. 3 shows an example block diagram of an example imaging device 300, which in some cases may be part of one of the cameras described with reference to FIGS. 1A and 1B. The imaging device 300 may also be the image sensor described with reference to FIG. 2A, or an imaging device including the pixels described with reference to FIG. 2B or 2C. The imaging device 300 may include an image sensor 302 and an image signal processor 304 (ISP; or image processor).

The imaging device 300 may include a pixel array (e.g., an imaging area), a column select circuit 306, and a row select circuit 308. The pixel array may be implemented as a pixel array that includes a plurality of pixels 310. The pixels 310 may be same colored pixels (e.g., for a monochrome pixel array) or differently colored pixels (e.g., for a multi-color pixel array). In the illustrated embodiment, the pixels 310 are arranged in rows and columns. However, other embodiments are not limited to this configuration. The pixels 310 in a pixel array may be arranged in any suitable configuration, such as, for example, a hexagonal configuration.

The pixel array may be in communication with the column select circuit 306 through one or more column select lines 312, and with the row select circuit 308 through one or more row select lines 314. The row select circuit 308 may selectively activate a particular pixel 310 or group of pixels, such as all of the pixels 310 in a particular row. The column select circuit 306 may selectively receive the data output from a selected pixel 310 or group of pixels (e.g., all of the pixels 310 in a particular row).

The row select circuit 308 and/or column select circuit 306 may be in communication with the ISP 304. The ISP 304 may process data received from the pixels 310 and provide the data to another processor (e.g., a system processor) and/or other components of a device (e.g., other components of the device described with reference to FIGS. 1A and 1B). In some embodiments, the ISP 304 may be incorporated into the system processor. The ISP 304 may receive pixel values from some or all of the pixels 310, and may process some or all of the pixel values to generate an image.

Figure 4:
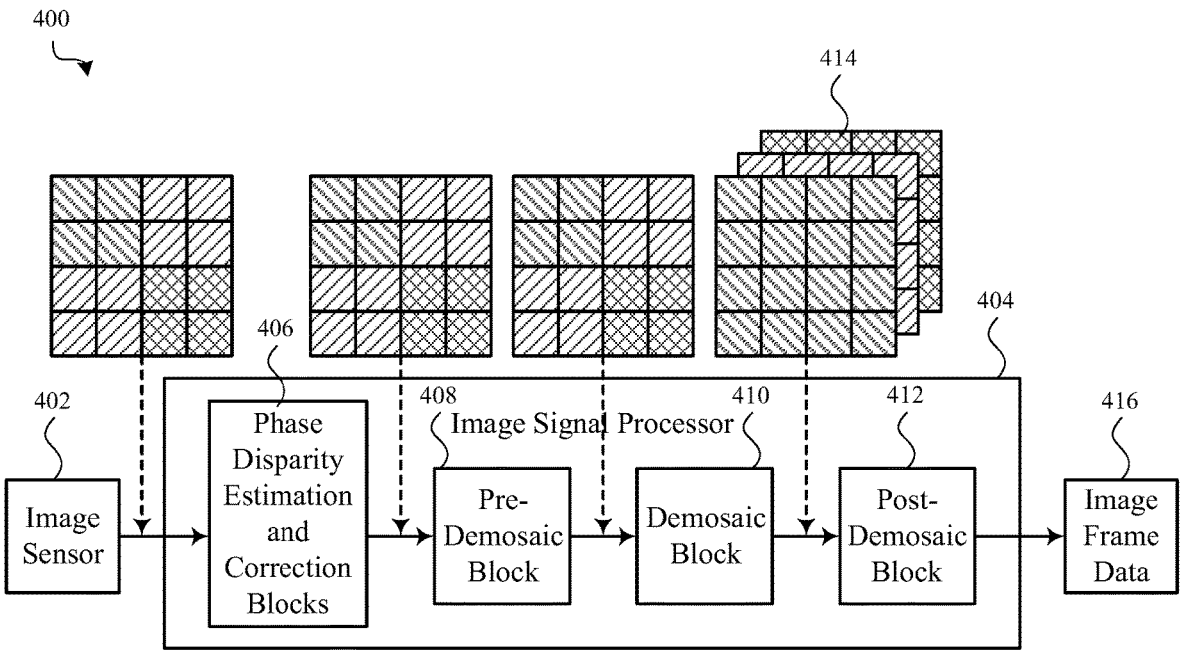
FIG. 4 shows an example block diagram of an imaging device, which in some cases may be the imaging device described with reference to FIG. 3, or one of the cameras described with reference to FIGS. 1A and 1B.

FIG. 4 shows an example block diagram of an imaging device 400, which in some cases may be the imaging device described with reference to FIG. 3, or one of the cameras described with reference to FIGS. 1A and 1B. The imaging device includes an image sensor 402 coupled to an ISP 404. The terms image processor and ISP are used interchangeably herein.

The image sensor 402 may be configured similarly to one or more of the image sensors described with reference to FIGS. 1A-2C.

The ISP 404 may include one or more integrated circuits that, individually or together, provide an image processing pipeline having one or more components, code segments, or functional blocks. As shown, the image processing pipeline may include phase disparity estimation and correction blocks 406, an optional pre-demosaic block 408, a demosaic block 410, and an optional post-demosaic block 412. The image processing pipeline may also include additional or alternative components, code segments, or blocks, or in some cases may not include the pre-demosaic block 408 or the post-demosaic block 412.

The ISP 404 may receive values measured by the pixels and/or subpixels of the image sensor 402. By way of example, the image sensor 402 may include at least some pixels that include phase disparity subpixels. For an image sensor 402 configured as described with reference to FIGS. 2A-2C, for example, the received values may be for pixels associated with a Bayer color filter pattern.

The phase disparity estimation and correction blocks 406 may include a phase disparity estimation block and a phase disparity correction block. The phase disparity estimation block may estimate phase disparities between the values measured by at least the phase disparity pixels. The phase disparity correction block may use the estimated phase disparities to generate a set of corrected values for the phase disparity subpixels.

The optional pre-demosaic block 408 (or pre-demosaicer) may be configured to perform pre-demosaic operations on the corrected values generated by the phase disparity correction block, before making the corrected values available to the demosaic block 410.

The demosaic block 410 (or demosaicer) may use the corrected values for the phase disparity subpixels to generate a set of demosaiced values for each image plane in a set of image planes 414. Each image plane may be associated with a different type of filter element in a set of filter elements disposed over the pixels of the image sensor 402. For example, in cases where the pixels of the image sensor 402 are associated with a Bayer color filter pattern, the image planes in the set of image planes 414 may include a red image plane, a green image plane, and a blue image plane. In such cases, the demosaic block 410 may alternatively be referred to as a deBayering block.

The optional post-demosaic block 412 (or post-demosaicer) may be configured to perform post-demosaic operations on the set of demosaiced values and output an image frame 416 (image frame data) that may be stored in memory or used by downstream components, processes, or applications.

Although the phase disparity estimation and correction blocks 406 are shown prior to the pre-demosaic block 408 in the image processing pipeline shown in FIG. 4, the phase disparity estimation and correction blocks 406 may alternatively be disposed within or after the pre-demosaic block 408, so long as the phase disparity estimation and correction blocks 406 are upstream from the demosaic block 410 (unless, for example, phase disparity estimation and correction is performed on values measured by some phase disparity subpixels while demosaicing is performed on phase disparity-corrected values for other phase disparity subpixels, in which case at least some operations of the phase disparity estimation and correction blocks may be performed while at least some operations of the demosaic block are being performed. When the phase disparity estimation and correction blocks 406 are disposed within the pre-demosaic block 408, the phase disparity estimation and correction blocks 406 may be disposed after operations that are performed on a per pixel basis (e.g., after image cropping; sensor linearization (e.g., gamma correction); gain, offset, or clamping of phase disparity subpixel values; or lens shading correction), but before operations that are performed on groups of pixels (e.g., defective pixel correction (e.g., using interpolation); chromatic aberration correction (e.g., when scaling with interpolation); up or down scaling; or noise filtering).

Figure 5:
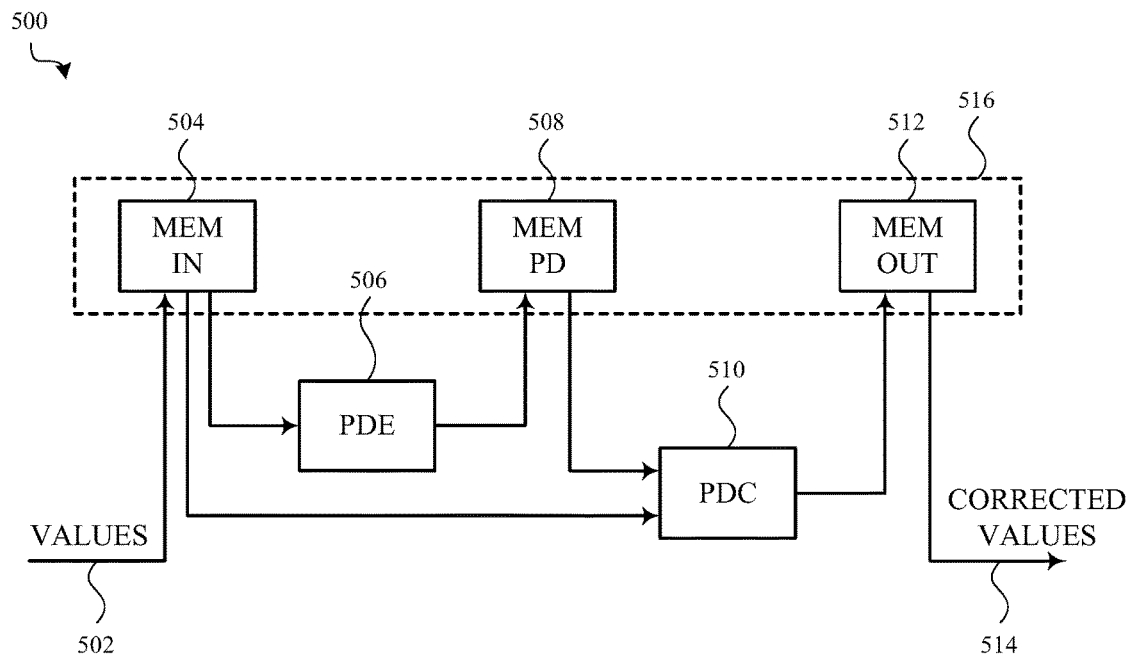
FIG. 5 shows a set of example phase disparity estimation and correction blocks, which in some cases may be the phase disparity estimation and correction blocks described with reference to FIG. 4.

FIG. 5 shows a set of example phase disparity estimation and correction blocks 500, which in some cases may be the phase disparity estimation and correction blocks described with reference to FIG. 4.

As shown, values 502 measured by the pixels and/or subpixels (e.g., the phase disparity subpixels) of an image sensor may be received from the image sensor and stored in a first memory block 504 (MEM IN).

The values measured by at least the phase disparity subpixels may be retrieved from the first memory block 504 by (or for) a phase disparity estimation block 506 (or phase disparity estimation code segment, or phase disparity estimator (PDE)). The phase disparity estimation block 506 may be configured to estimate phase disparities, between the measurement values acquired by at least a first set of phase disparity subpixels of a pixel, using measurement values acquired by at least 1) the first set of phase disparity subpixels of the pixel, and 2) a second set of phase disparity subpixels of at least one neighboring pixel. The first set of phase disparity subpixels and the second set of phase disparity subpixels may receive light through a same type of filter element in a set of filter elements (e.g., through a red filter element, or a green filter element, or a blue filter element). The phase disparities estimated by the phase disparity estimation block 506 may be stored in a second memory block 508 (MEM PD).

The values measured by at least the phase disparity subpixels, as stored in the first memory block 504, and the phase disparities stored in the second memory block 508, may be retrieved by (or for) a phase disparity correction block 510 (or phase disparity correction code segment, or phase disparity corrector (PDC)). The phase disparity correction block 510 may be configured to generate a set of corrected values for the phase disparity subpixels by modifying the values retrieved from the first memory block 504 using the estimated phase disparities. In some cases, the correction may be performed using a two-dimensional interpolation, such as a bilinear interpolation or bicubic interpolation. The corrected values for the phase disparity subpixels may be stored in a third memory block 512 (MEM OUT), and then read out as corrected values 514.

In some embodiments, the first, second, and third memory blocks 504, 508, 512 may be portions of a single larger memory 516. In other embodiments, the memory blocks 504, 508, 512 may be separate memories.

Figure 6:
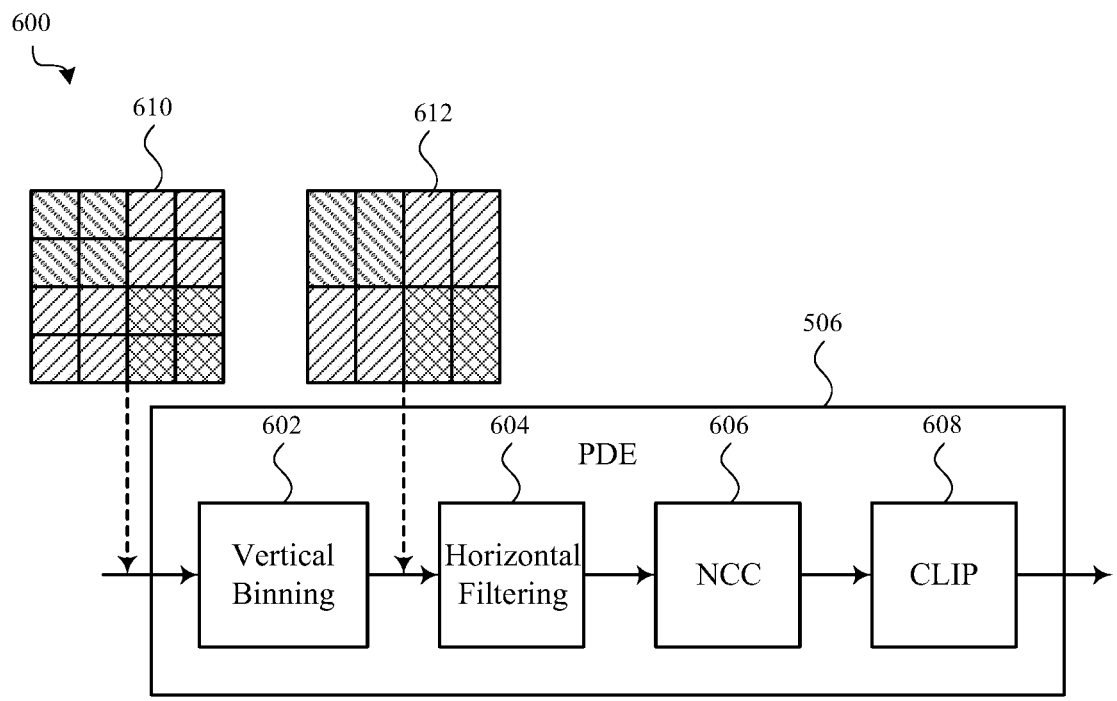
FIG. 6 shows an example block diagram of the phase disparity estimation block described with reference to FIG. 5.

FIG. 6 shows an example block diagram 600 of the phase disparity estimation block 506 (or phase disparity estimation code segment, or phase disparity estimator) described with reference to FIG. 5. The phase disparity estimation block includes a vertical binning block 602 (or vertical binner), a horizontal filtering block 604 (or horizontal filter), a normalized cross correlation (NCC) block 606 (or normalized cross correlation function, or normalized cross correlator), and a clipping (CLIP) block 608 (or clipper).

The vertical binning block 602 may be configured to combine the received values measured by phase disparity subpixels disposed along a vertical direction within a pixel. Vertical binning is shown conceptually in FIG. 6, by the difference between the phase disparity subpixels in the image 610 input into the vertical binning block 602, and the combined phase disparity subpixels in the image 612 output from the vertical binning block 602. Binning can improve the quality of image processing for low light conditions.

The horizontal filtering block 604 may be configured to filter the combined values generated by the vertical binning block 602. The horizontal filtering block 604 may be a finite impulse response (FIR) filter with downloadable filter coefficients. The horizontal filtering block 604 can be used as a low-pass filter to improve signal-to-noise ratio (SNR) for low light conditions, or for edge detection.

The normalized cross correlation (NCC) block 606 may be configured to estimate a relative shift of the combined values along a horizontal direction within the pixel. The NCC block 606 may be configured to estimate the relative shift using values acquired by at least 1) a first set of phase disparity subpixels of the pixel, and 2) a second set of phase disparity subpixels of at least one neighboring pixel. The first set of phase disparity subpixels and the second set of phase disparity subpixels may receive light through a same type of filter element in a set of filter elements (e.g., through a red filter element, or a green filter element, or a blue filter element). The relative shifts estimated by the normalized cross correlation block 606 may in some cases be represented in the format INT.FR, where INT is an integer portion of a shift, and FR is a fractional part of a shift. The fractional part of the shift may be calculated by interpolating the NCC results.

The clipping block 608 may be configured to limit estimation of the phase disparities to out-of-focus areas of an image. In some embodiments, the out-of-focus areas may be areas that are out-of-focus more than a threshold amount. In some embodiments, the clipping block 608 may have a set of predetermined or programmable thresholds.

In alternative embodiments, the vertical binning block 602 may be a binning block (or binner) that bins values along any first direction, and the horizontal filtering block 604 may be a filtering block (or filter) that filters combined values along a second direction orthogonal to the first direction. In these embodiments, the normalized cross correlation block 606 may be configured to estimate a relative shift of the combined values along the second direction within the pixel.

More generally, and in some embodiments, an image processor may be configured to bin values of phase disparity subpixels disposed along a first direction within a pixel, and estimate, using the binned values, phase disparities within the pixel along a second direction. The image processor may then correct the values of the phase disparity subpixels within the pixel. In particular, the image processor may be configured to use the estimated phase disparities along the second direction within the pixel to 1) correct the values of the phase disparity subpixels along the second direction within the pixel, and also 2) correct the values of the phase disparity subpixels along the first direction within the subpixel. The second direction may be orthogonal to the first direction. The values of the phase disparity subpixels disposed along the first direction may be corrected using a two-dimensional interpolation, such as a bilinear interpolation or a bicubic interpolation.

Figure 7:
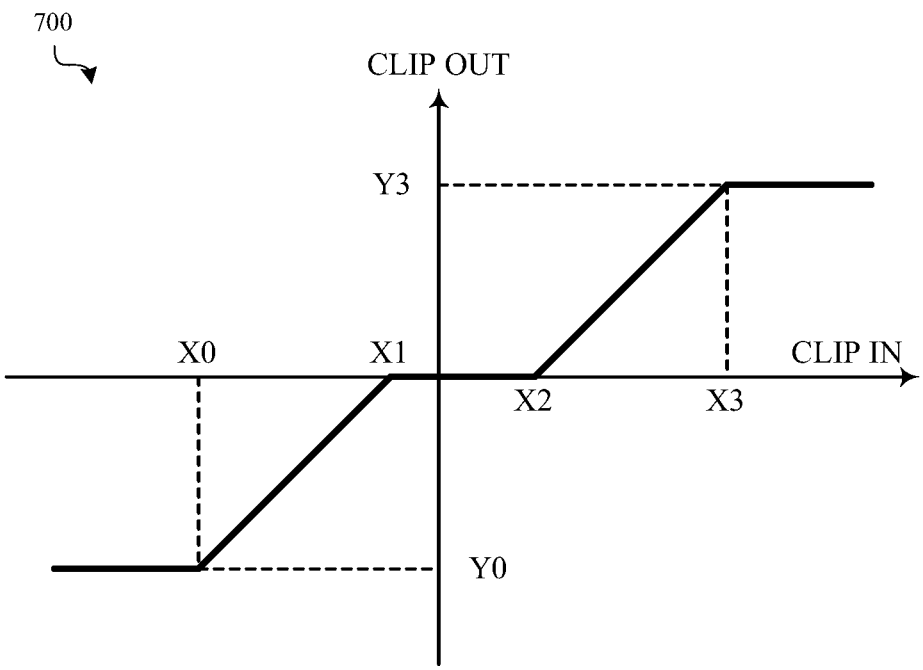
FIG. 7 shows a graph of an example clipping function that may be used by the phase disparity estimator described with reference to any of FIGS. 4-6.

FIG. 7 shows a graph of an example clipping function 700 that may be used by the phase disparity estimation block (or clipping block) described with reference to any of FIGS. 4-6. The function may have a set of predetermined or programmable thresholds (e.g., thresholds X0, X1, X2, and X3). As shown in FIG. 7, for phase disparities below a value X0 or above a value X3 (i.e., out-of-focus areas of an image), the clipping function 700 may provide a maximum phase disparity correction of Y0 or Y3. Y0 and Y3 may be predetermined or programmable amounts of correction. For phase disparities between a value X1 and a value X2 (i.e., in-focus areas of an image), the clipping function 700 may provide no phase disparity correction. For a phase disparity between a value X0 and a value X1, or between a value X2 and a value X3, the clipping function 700 may provide different amounts of phase disparity correction, varying from no phase disparity correction to a maximum phase disparity correction (i.e., to Y0 or Y3).

Figure 8:
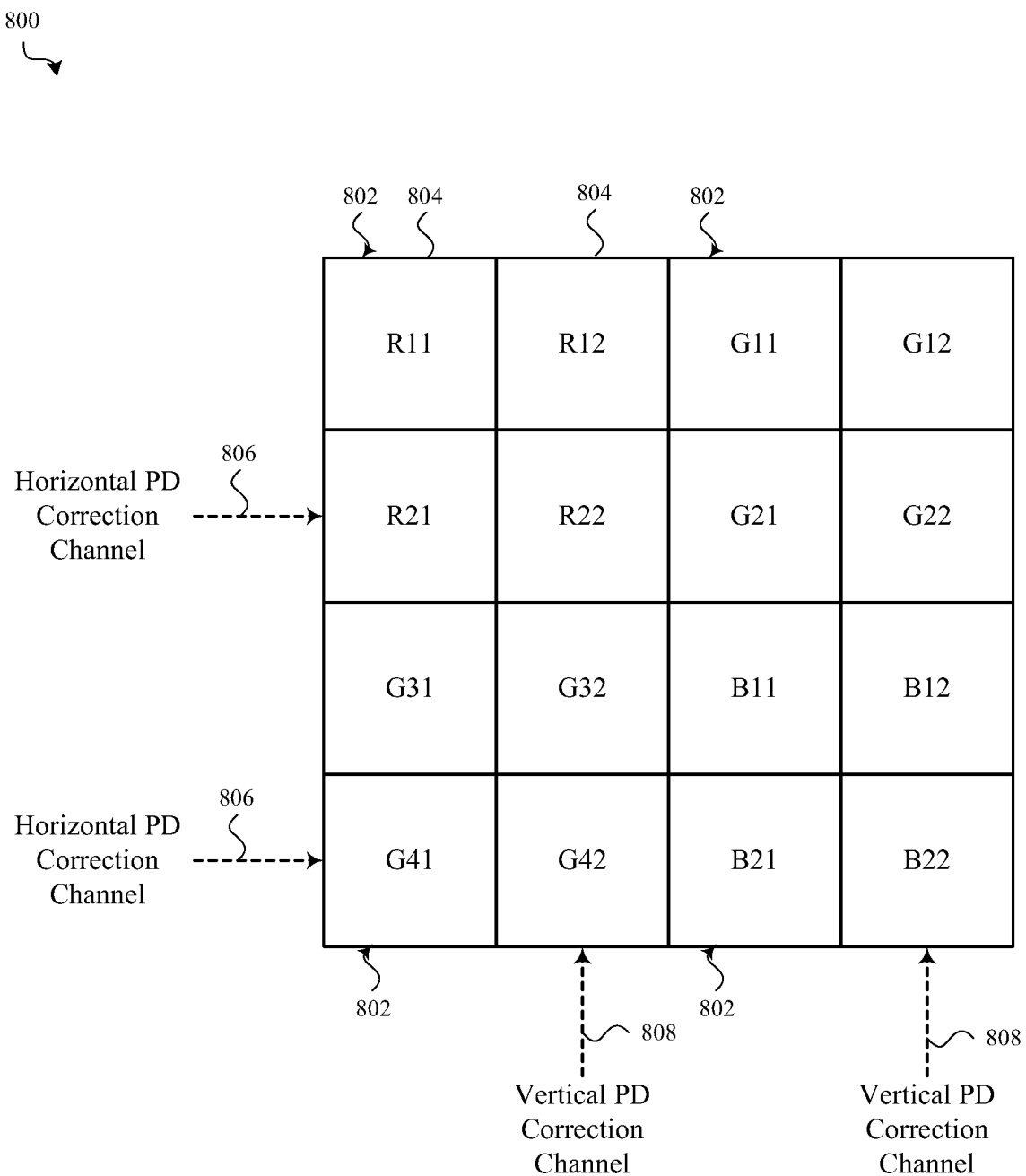
FIG. 8 shows an enlarged portion of an image sensor, which in some cases may be the portion of the image sensor described with reference to FIG. 2B.

FIG. 8 shows an enlarged portion 800 of an image sensor, which in some cases may be the portion of the image sensor described with reference to FIG. 2B. The portion 800 of the image sensor includes a 2×2 array of pixels 802, and each pixel 802 includes a 2×2 array of phase disparity subpixels 804.

After estimating phase disparities between the values of subpixels 804 within a pixel 802, the estimated phase disparities may be used to generate a set of corrected values for the phase disparity subpixels 804. As shown in FIG. 8, this may be done by correcting the values for only three of four phase disparity subpixels 804 in each array of phase disparity subpixels. Three of four phase disparity subpixels 804 may be corrected in each array of phase disparity subpixels (i.e., in each pixel 802) by applying corrections to 1) the subpixels 804 in a number of horizontal phase disparity (PD) correction channels 806 (e.g., every other row of subpixels 804 in an array of pixels 802), and 2) the subpixels 804 in a number of vertical PD correction channels 808 (e.g., every other column of subpixels 804 in an array of pixels 802).

Figure 9:
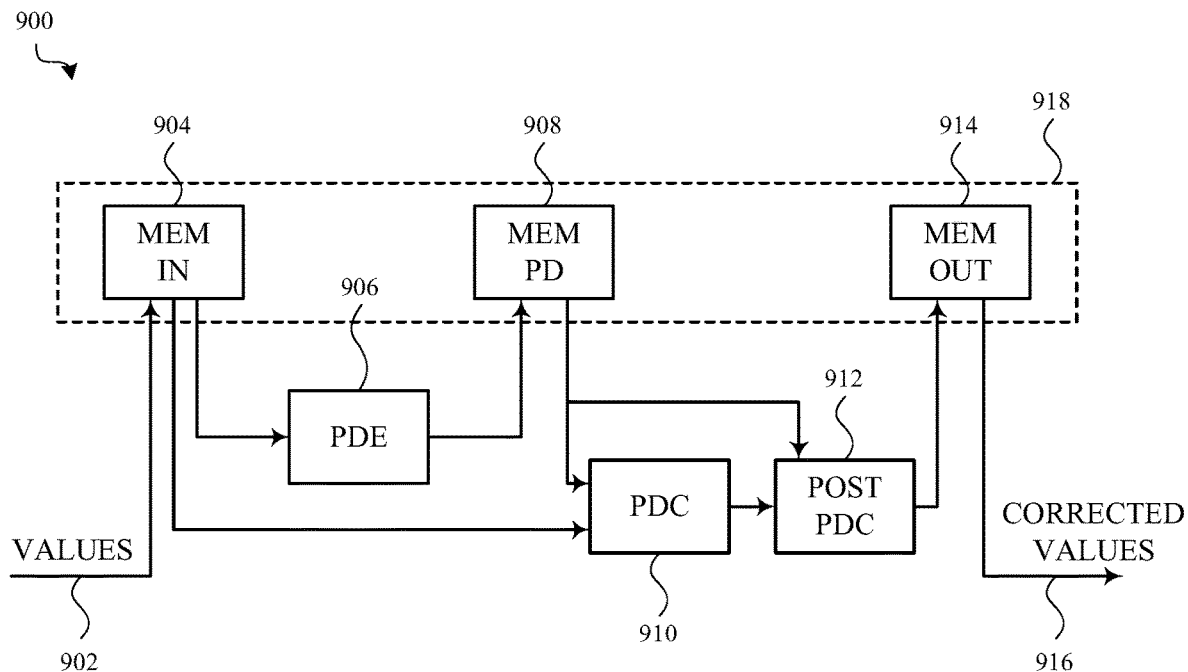
FIG. 9 shows a set of example phase disparity estimation and correction blocks, which in some cases may be the phase disparity estimation and correction blocks described with reference to FIG. 4.

FIG. 9 shows another set of example phase disparity estimation and correction blocks 900, which in some cases may be the phase disparity estimation and correction blocks described with reference to FIG. 4.

As shown, values 902 measured by the pixels and/or subpixels (e.g., the phase disparity subpixels) of an image sensor may be received from the image sensor and stored in a first memory block 904 (MEM IN).

The values measured by at least the phase disparity subpixels may be retrieved from the first memory block 904 by (or for) a phase disparity estimation block 906 (or phase disparity estimation code segment, or phase disparity estimator (PDE)). The phase disparity estimation block 906 may be configured to estimate phase disparities between the measurement values acquired by at least a first set of phase disparity subpixels of a pixel, using measurement values acquired by at least 1) the first set of phase disparity subpixels of the pixel, and 2) a second set of phase disparity subpixels of at least one neighboring pixel. The first set of phase disparity subpixels and the second set of phase disparity subpixels may receive light through a same type of filter element in a set of filter elements (e.g., through a red filter element, or a green filter element, or a blue filter element). The phase disparities estimated by the phase disparity estimation block may be stored in a second memory block 908 (MEM PD).

The values measured by at least the phase disparity subpixels, as stored in the first memory block 904, and the phase disparities stored in the second memory block 908, may be retrieved by (or for) a phase disparity correction block 910 (or phase disparity correction code segment, or phase disparity corrector (PDC)). The phase disparity correction block 910 may be configured to generate a set of corrected values for the phase disparity subpixels, by modifying the values retrieved from the first memory block 904 using the estimated phase disparities. In some cases, the correction may be performed using a two-dimensional interpolation, such as a bilinear interpolation or bicubic interpolation.

The corrected values output from the phase disparity correction block 910 may be output to a post-phase disparity correction block 912 (POST PDC). The phase disparity corrections stored in the second memory block 908 may also be provided to the post-phase disparity correction block 912. The post-phase disparity correction block 912 may operate as a blurring filter for areas of an image that are out-of-focus by more than a threshold amount (typically very out-of-focus areas), as described in more detail with reference to FIG. 11.

The finally corrected values for the phase disparity subpixels, as output by the post-phase disparity correction block 912, may be stored in a third memory block 914 (MEM OUT), and then read out as corrected values 916.

In some embodiments, the first, second, and third memory blocks 904, 908, 914 may be portions of a single larger memory 918. In other embodiments, the memory blocks 904, 908, 914 may be separate memories.

Figure 10:
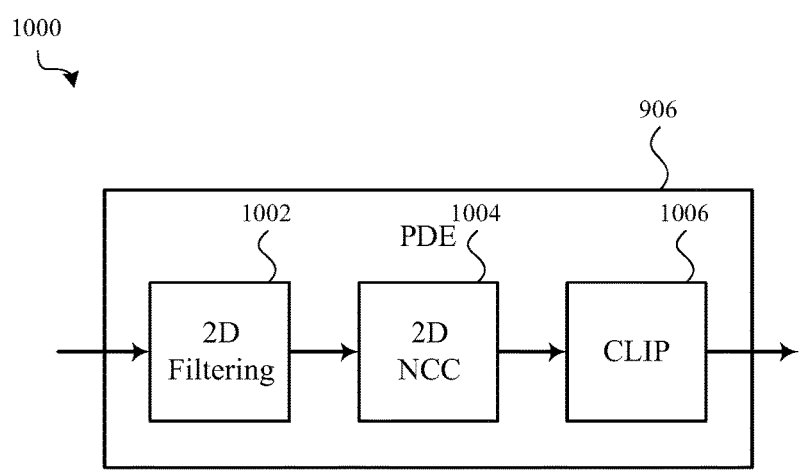
FIG. 10 shows another example block diagram of the phase disparity estimation block described with reference to FIG. 9.

FIG. 10 shows an example block diagram 1000 of the phase disparity estimation block 906 (or phase disparity estimation code segment, or phase disparity estimator (PDE)) described with reference to FIG. 9. The phase disparity estimation block 906 includes a two-dimensional (2D) filtering block 1002 (or 2D filter), a 2D NCC block 1004 (or 2D normalized cross correlator), and a clipping block 1006 (or clipper).

The 2D filtering block 1002 may be configured to filter the received values measured by phase disparity subpixels of an image sensor.

The 2D NCC block 1004 may be configured to estimate a relative shift of the values within a pixel. The 2D NCC block may be configured to estimate the relative shift using values acquired by at least 1) a first set of phase disparity subpixels of the pixel, and 2) a second set of phase disparity subpixels of at least one neighboring pixel. The first and second sets of phase disparity subpixels may receive light through a same type of filter element in a set of filter elements (e.g., through a red filter element, or a green filter element, or a blue filter element). Alternatively, cross-color processing may be performed and the first and second sets of phase disparity subpixels may receive light through different types of filter elements.

The clipping block 1006 may be configured to limit estimation of the phase disparities to out-of-focus areas of an image. In some embodiments, the out-of-focus areas may be areas that are out-of-focus more than a threshold amount. In some embodiments, the clipping block may have a set of programmable thresholds.

In contrast to the phase disparity estimation block described with reference to FIG. 6, the phase disparity estimation block 906 described with reference to FIG. 10 may determine horizontal and vertical phase disparities independently. While this can improve the accuracy of the phase disparity estimation, it can also increase the processing burden imposed on an image processing pipeline. For example, the phase disparity estimation block described with reference to FIG. 10 may require a faster image processor and/or more memory, or the time required to estimate and correct phase disparities may substantially increase. In some embodiments, the phase disparity correction performed after estimating phase disparities as described with reference to FIG. 10 may be performed using bicubic interpolation.

When independently correcting phase disparities in two dimensions, it can be useful to perform further processing on phase disparity-corrected values (e.g., on the output of the phase disparity correction block described with reference to FIG. 9). The further processing may include local low-pass filtering (e.g., blurring filtering) on corrected values that are in sufficiently out-of-focus areas of an image. The sufficiently out-of-focus areas may be defined by one or more thresholds (e.g., by one or more thresholds of a post-clipping block). An example of the further processing that may be performed on the corrected values output by a phase disparity correction block is described with reference to FIGS. 11 and 12.

Figure 11:
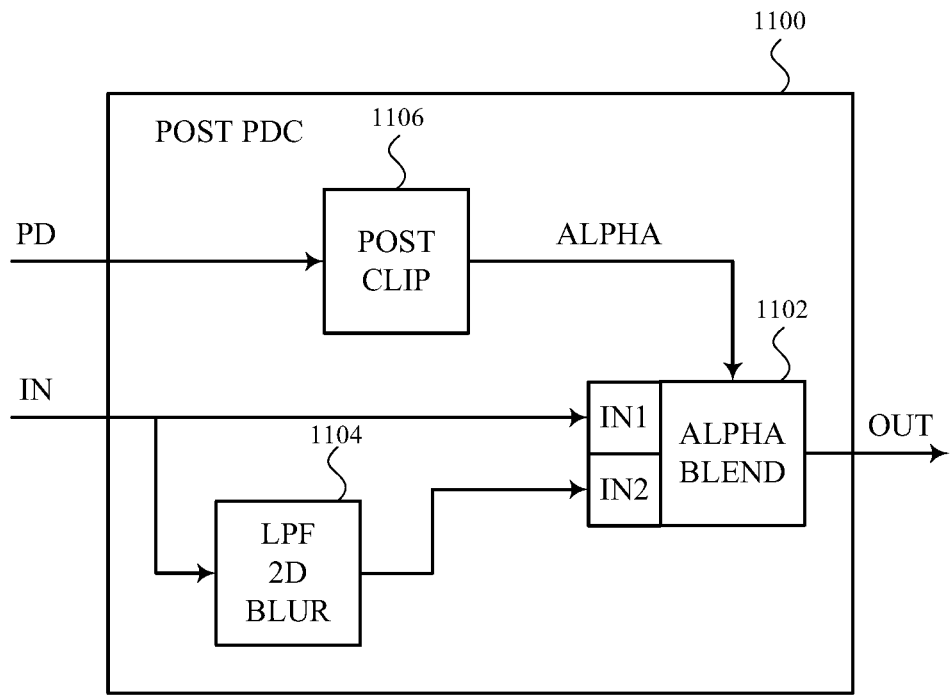
FIG. 11 shows an example post-phase disparity correction block that may be implemented by an image signal processor (ISP) including one or more integrated circuits that, individually or together, provide an image processing pipeline having one or more components, code segments, or functional blocks.

FIG. 11 shows an example post-phase disparity correction block 1100 (POST PDC block) that may be implemented by an ISP including one or more integrated circuits that, individually or together, provide an image processing pipeline having one or more components, code segments, or functional blocks.

The post-phase disparity correction block 1100 receives the output of a phase disparity correction block, for a pixel, at a first input (IN). The first input (IN) of the post-phase disparity correction block 1100 is provided as a first input (IN1) to an alpha blending block 1102 (ALPHA BLEND block), and as an input to a two-dimensional blurring block 1104 (LPF 2D BLUR block) where the first input undergoes two-dimensional low pass filtering (e.g., blurring). An output of the two-dimensional blurring block 1104 is provided as a second input (IN2) to the alpha blending block 1102.

Figure 12:
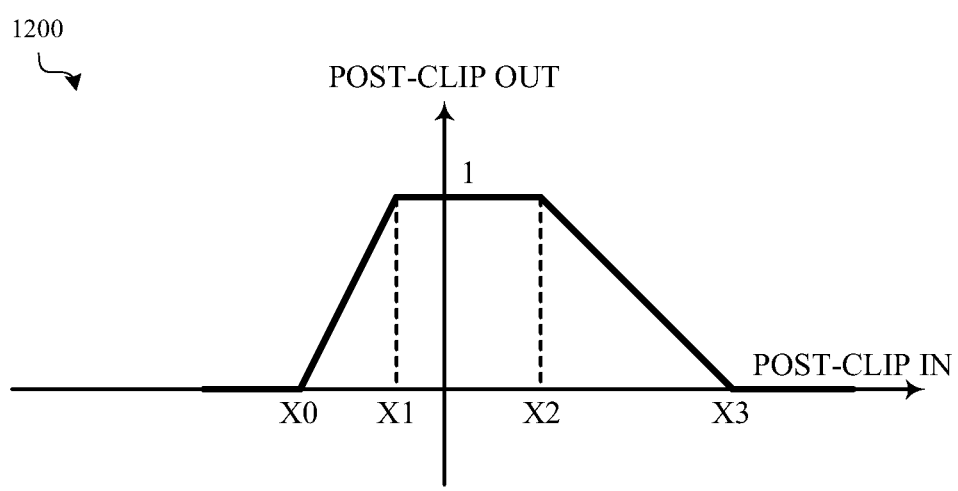
FIG. 12 shows an example clipping function that may be used by the post-clipping block described with reference to FIG. 11

Phase disparity estimates between the pixel's phase disparity subpixels are received at a second input (PD) to the post-phase disparity correction block 1100, and are provided to a post-clipping block 1106 (POST-CLIP block). An example of the post-clipping function used by the post-clipping block 1106 is described with reference to FIG. 12. The post-clipping block 1106 outputs a control signal, ALPHA, that controls whether and how the inputs to the alpha blending block 1102 are mixed for purposes of blurring filtering. In particular, the alpha blending block 1102 may implement the function:

OUT=IN1*ALPHA+IN2*(1-ALPHA)

where ALPHA may be defined by the post-clipping function shown in FIG. 12.

FIG. 12 shows an example of the post-clipping function that may be used by the post-clipping block described with reference to FIG. 11. The post-clipping function 1200 shown in FIG. 12 may have predetermined or programmable thresholds (e.g., thresholds X0, X1, X2, and X3). For phase disparities below a value X0 or above a value X3 (i.e., out-of-focus areas of an image), the post-clipping function 1200 may cause an alpha blending block to output a blurred value for a phase disparity subpixel (e.g., the value of the input IN2). For phase disparities between a value X1 and a value X2 (i.e., in-focus areas of an image), the post-clipping function 1200 may cause the alpha blending block to output a value for a phase disparity subpixel (e.g., the value of the input IN1), which value has been corrected by a phase disparity correction block, but not further corrected (or blurred) by the POST PDC block. Phase disparities between the values X0 and X1, or between the values X2 and X3, represent transitional phase disparities, between out-of-focus and in-focus areas of an image. For these phase disparities, the post-clipping function 1200 may cause the alpha blending block to output a partially blurred value for a phase disparity subpixel.

Figure 13:
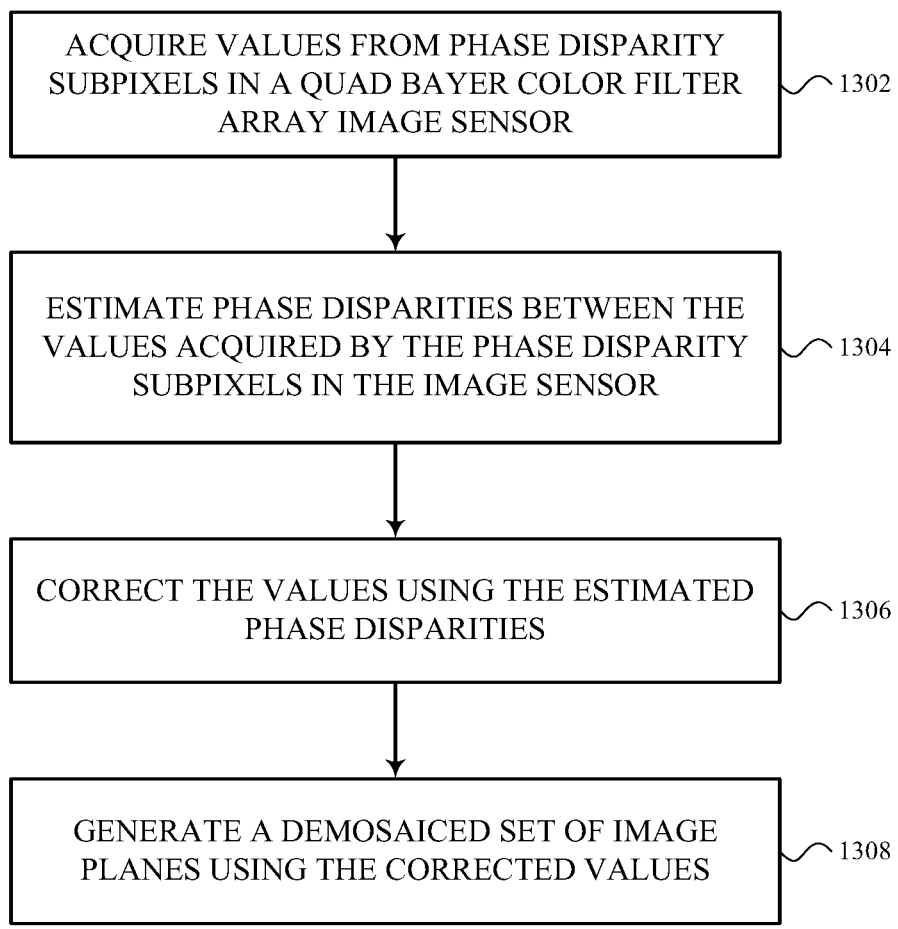
FIG. 13 shows an example method of correcting values of at least the phase disparity subpixels in an image sensor.

FIG. 13 shows an example method 1300 of correcting values of at least the phase disparity subpixels in an image sensor.

At block 1302, the method 1300 may include acquiring values from phase disparity subpixels in a quad Bayer color filter array image sensor, in which each pixel in the image sensor includes a 2×2 array of phase disparity subpixels.

At block 1304, the method 1300 may include estimating phase disparities between the values measured by the phase disparity subpixels.

At block 1306, the method 1300 may include correcting the values using the estimated phase disparities.

At block 1308, the method 1300 may include generating a demosaiced set of image planes using the corrected values. Each image plane may be associated with a different color in the quad Bayer color filter array image sensor (e.g., the image planes may include a red image, a green image, and a blue image).

Figure 14:
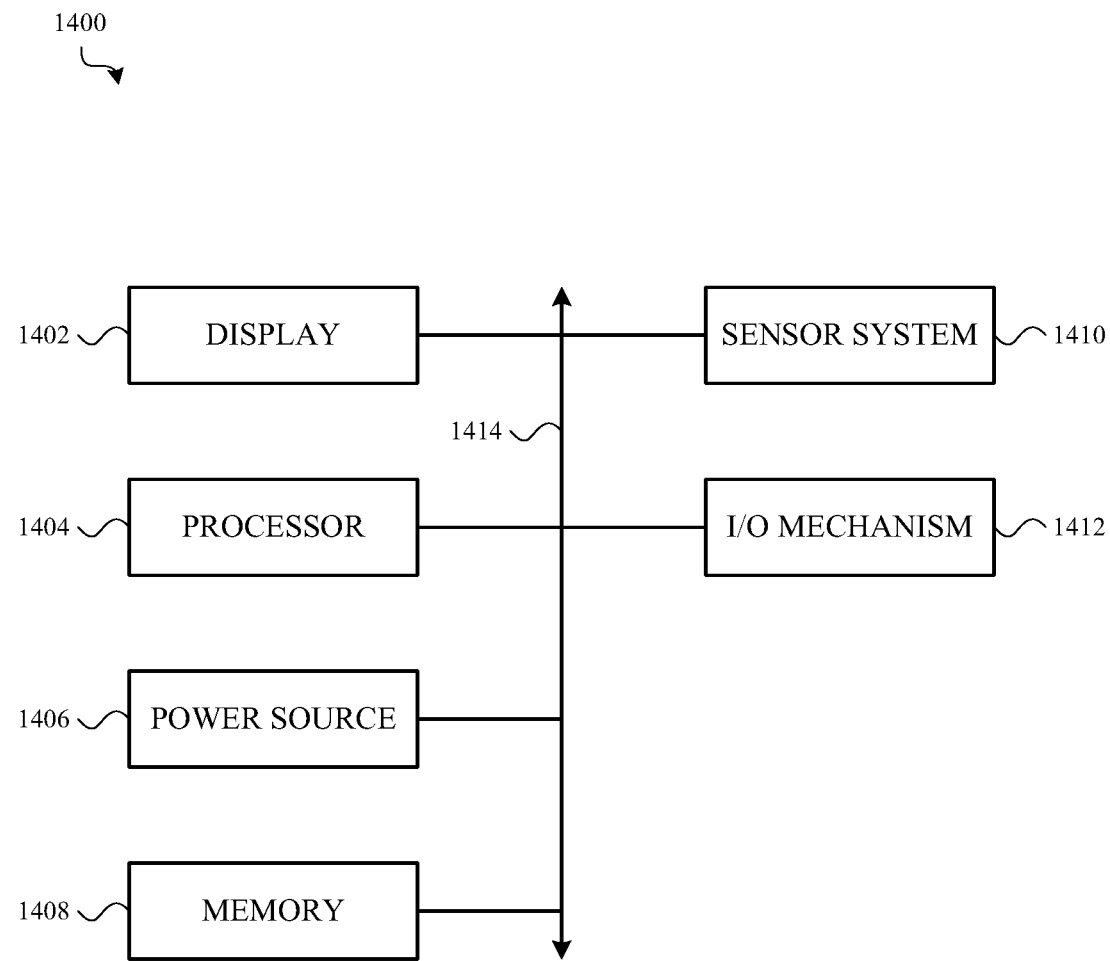
FIG. 14 shows a sample electrical block diagram of an electronic device that includes an image sensor.

FIG. 14 shows a sample electrical block diagram of an electronic device 1400 that includes an image sensor, such as the image sensor described with reference to FIG. 2. The electronic device 1400 may take forms such as a hand-held or portable device (e.g., a smartphone, tablet computer, or electronic watch), a navigation system of a vehicle, and so on. The electronic device 1400 may include an optional display 1402 (e.g., a light-emitting display), a processor 1404, a power source 1406, a memory 1408 or storage device, a sensor system 1410, and an optional input/output (I/O) mechanism 1412 (e.g., an input/output device and/or input/output port). The processor 1404 may control some or all of the operations of the electronic device 1400. The processor 1404 may communicate, either directly or indirectly, with substantially all of the components of the electronic device 1400. For example, a system bus or other communication mechanism 1414 may provide communication between the processor 1404, the power source 1406, the memory 1408, the sensor system 1410, and/or the input/output mechanism 1412.

The processor 1404 may be implemented as any electronic device capable of processing, receiving, or transmitting data or instructions. For example, the processor 1404 may be a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

In some embodiments, the components of the electronic device 1400 may be controlled by multiple processors. For example, select components of the electronic device 1400 may be controlled by a first processor and other components of the electronic device 1400 may be controlled by a second processor, where the first and second processors may or may not be in communication with each other.

The power source 1406 may be implemented with any device capable of providing energy to the electronic device 1400. For example, the power source 1406 may include one or more disposable or rechargeable batteries. Additionally or alternatively, the power source 1406 may include a power connector or power cord that connects the electronic device 1400 to another power source, such as a wall outlet.

The memory 1408 may store electronic data that may be used by the electronic device 1400. For example, the memory 1408 may store electrical data or content such as, for example, audio and video files, documents and applications, device settings and user preferences, timing signals, control signals, data structures or databases, image data, maps, or focus settings. The memory 1408 may be configured as any type of memory. By way of example only, the memory 1408 may be implemented as random access memory, read-only memory, Flash memory, removable memory, other types of storage elements, or combinations of such devices.

The electronic device 1400 may also include one or more sensors defining the sensor system 1410. The sensors may be positioned substantially anywhere on the electronic device 1400. The sensor(s) may be configured to sense substantially any type of characteristic, such as but not limited to, touch, force, pressure, electromagnetic radiation (e.g., light), heat, movement, relative motion, biometric data, distance, and so on. For example, the sensor system 1410 may include a touch sensor, a force sensor, a heat sensor, a position sensor, a light or optical sensor, an accelerometer, a pressure sensor (e.g., a pressure transducer), a gyroscope, a magnetometer, a health monitoring sensor, an image sensor, and so on. Additionally, the one or more sensors may utilize any suitable sensing technology, including, but not limited to, capacitive, ultrasonic, resistive, optical, ultrasound, piezoelectric, and thermal sensing technology.

The I/O mechanism 1412 may transmit and/or receive data from a user or another electronic device. An I/O device may include a display, a touch sensing input surface such as a track pad, one or more buttons (e.g., a graphical user interface "home" button, or one of the buttons described herein), one or more cameras (including one or more image sensors), one or more microphones or speakers, one or more ports such as a microphone port, and/or a keyboard. Additionally or alternatively, an I/O device or port may transmit electronic signals via a communications network, such as a wireless and/or wired network connection. Examples of wireless and wired network connections include, but are not limited to, cellular, Wi-Fi, Bluetooth, IR, and Ethernet connections. The I/O mechanism 1412 may also provide feedback (e.g., a haptic output) to a user.

The foregoing description, for purposes of explanation, uses specific nomenclature to provide a thorough understanding of the described embodiments. However, it will be apparent to one skilled in the art, after reading this description, that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art, after reading this description, that many modifications and variations are possible in view of the above teachings.

What is claimed is:

1. An imaging device, comprising:
  an image sensor including an array of pixels, wherein,
    at least one pixel in the array of pixels includes an array of phase disparity subpixels; and
    the array of pixels includes a set of filter elements arranged in a filter pattern, with different subsets of pixels receiving light through different types of filter elements in the set of filter elements; and
  an image processor configured to,
    receive values measured by at least the phase disparity subpixels;
    estimate phase disparities between the received values;
    generate, using the estimated phase disparities, a set of corrected values for the phase disparity subpixels; and
    performing a demosaicing operation using values for all of the pixels in the array of pixels, including the set of corrected values for the phase disparity subpixels, to generate a set of demosaiced values for each image plane in a set of image planes;
  wherein,
    each image plane is associated with a different type of filter element in the set of filter elements.

2. The imaging device of claim 1, wherein:
  each pixel in the array of pixels includes an array of phase disparity subpixels; and
  the filter pattern comprises a Bayer color filter pattern.

3. The imaging device of claim 1, wherein the array of phase disparity subpixels is a 2×2 array of phase disparity subpixels.

4. The imaging device of claim 3, wherein:
  the image processor is configured to,
    correct the received values for only three of four phase disparity subpixels in each array of phase disparity subpixels.

5. The imaging device of claim 1, wherein the image processor is configured to estimate phase disparities, between the values measured by at least a first set of phase disparity subpixels of a pixel, using the values measured by at least:
  the first set of phase disparity subpixels of the pixel; and
  a second set of phase disparity subpixels of at least one neighboring pixel; wherein,
    the first set of phase disparity subpixels and the second set of phase disparity subpixels receive light through a same type of filter element in the set of filter elements.

6. The imaging device of claim 1, further comprising:
  a first memory block configured to store the values measured by at least the phase disparity subpixels;
  a second memory block configured to store the estimated phase disparities; and
  a third memory block configured to store the set of corrected values for the phase disparity subpixels.

7. The imaging device of claim 1, wherein:
  the image processor is further configured to,
    perform pre-demosaic operations on the set of corrected values before performing the demosaicing operation to generate the set of demosaiced values; and
    perform post-demosaic operations on the set of demosaiced values.

8. The imaging device of claim 1, wherein:
  the image processor is configured to estimate the phase disparities using a normalized cross correlation function.

9. The imaging device of claim 1, wherein:
  the image processor is configured to,
    combine the received values measured by the phase disparity subpixels disposed along a first direction within a pixel;
    filter the combined values;
    estimate a relative shift of the combined values along a second direction within the pixel, the second direction orthogonal to the first direction; and
    limit estimation of the phase disparities to out-of-focus areas of an image.

10. The imaging device of claim 9, wherein the out-of-focus areas are areas that are out-of-focus more than a threshold amount.

11. The imaging device of claim 9, wherein the image processor has a set of programmable thresholds defining the out-of-focus areas of the image.

12. The imaging device of claim 1, wherein:
  the image processor is configured to,
    bin received values of phase disparity subpixels disposed along a first direction within a pixel; and
    estimate, using the binned values, phase disparities within the pixel along a second direction.

13. The imaging device of claim 12, wherein:
  the image processor is configured to,
    correct, using the estimated phase disparities along the second direction,
      the values of the phase disparity subpixels disposed along the second direction within the pixel; and
      values of the phase disparity subpixels disposed along the first direction within the pixel; and
    the second direction is orthogonal to the first direction.

14. The imaging device of claim 13, wherein:
  the image processor is configured to,
    correct the values of the phase disparity subpixels disposed along the first direction within the pixel using a two-dimensional interpolation.

15. The imaging device of claim 14, wherein the two-dimensional interpolation comprises at least one of bilinear interpolation or a bicubic interpolation.

16. A method of processing an image, comprising:
  acquiring values from phase disparity subpixels in a quad Bayer color filter array image sensor, in which each pixel of the quad Bayer color filter array image sensor comprises a 2×2 array of phase disparity subpixels;
  estimating phase disparities between the values measured by the phase disparity subpixels;
  correcting the values using the estimated phase disparities; and
  performing a demosaicing operation using values for all of the pixels in the quad Bayer color filter array image sensor, including the corrected values for the phase disparity subpixels, to generate a demosaiced set of image planes; wherein, each image plane is associated with a different color in a Bayer color filter.

17. The method of claim 16, further comprising:

after correcting the values using the estimated phase disparities, blurring the corrected values in areas of the image that are out-of-focus more than a threshold amount.

18. An imaging device comprising an image processing pipeline, the image processing pipeline comprising:

a phase disparity estimator configured to receive a set of values acquired by at least a set of phase disparity subpixels in an image sensor and estimate phase disparities between the values;

a phase disparity corrector configured to correct the values using the estimated phase disparities; and a demosaicer configured to operate on values for all of the pixels in the image sensor, including the corrected values, to generate a set of demosaiced values for each image plane in a set of image planes.

19. The imaging device of claim 18, wherein:

the phase disparity estimator is configured to, combine, for a pixel, the received values acquired by the phase disparity subpixels disposed along a first direction; and estimate a relative shift of the combined values along a second direction within the pixel, the second direction orthogonal to the first direction.

20. The imaging device of claim 18, wherein the phase disparity estimator is configured to estimate the phase disparities using a normalized cross correlation function.

* * * * *